INVENTOR.
CARL O. BRUESTLE
BY Darby + Darby
ATTORNEYS

March 3, 1964 C. O. BRUESTLE 3,123,314
REELING DEVICE FOR LARGE CABLES
Filed March 28, 1960 4 Sheets-Sheet 3
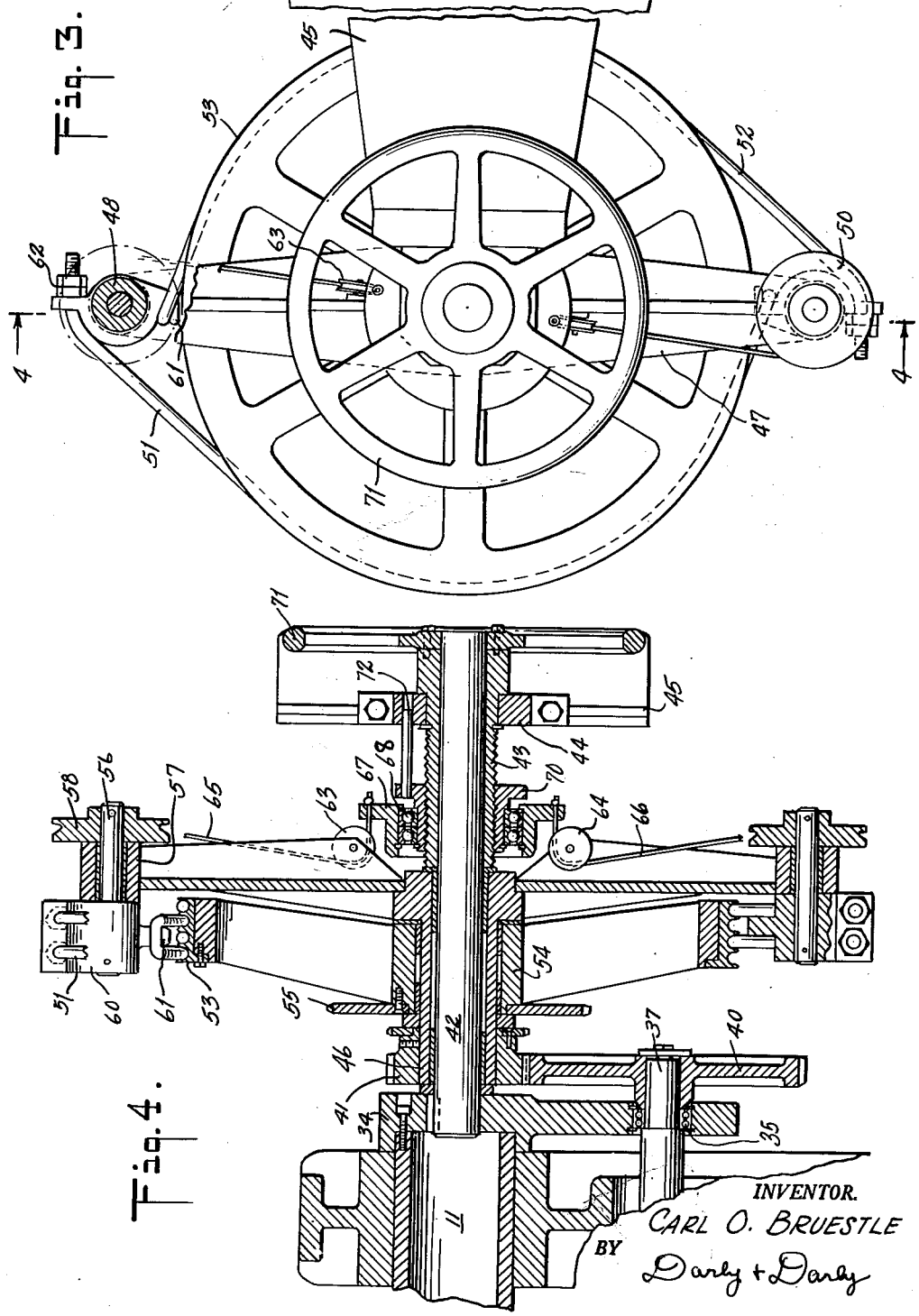
INVENTOR.
CARL O. BRUESTLE
BY Darby + Darby
ATTORNEYS

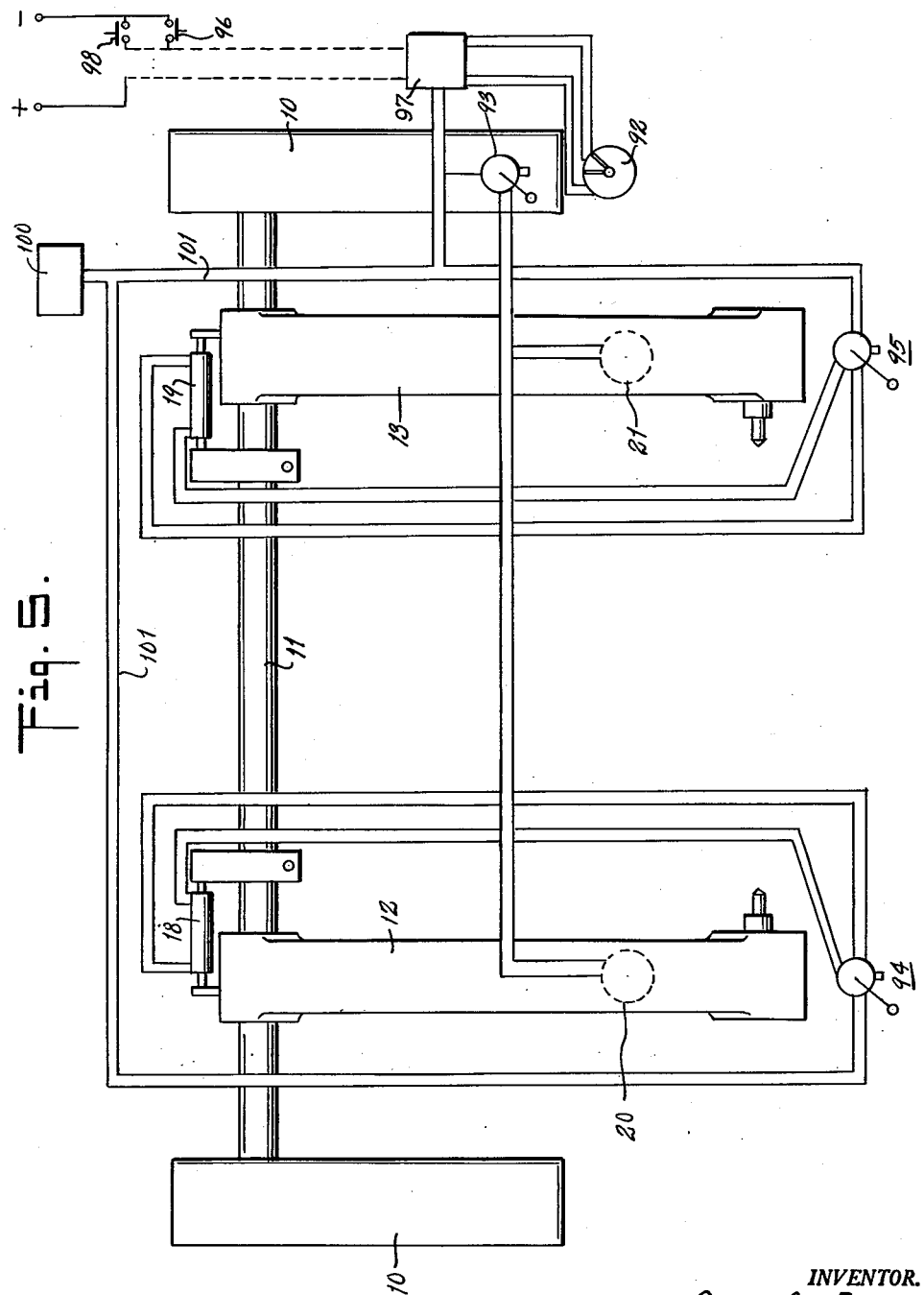

United States Patent Office 3,123,314
Patented Mar. 3, 1964

3,123,314
REELING DEVICE FOR LARGE CABLES
Carl O. Bruestle, Metuchen, N.J., assignor to Syncro Machine Company, Perth Amboy, N.J., a corporation of New Jersey
Filed Mar. 28, 1960, Ser. No. 18,166
7 Claims. (Cl. 242—54)

The present invention relates to reeling devices and particularly to reeling devices capable of handling large heavy cables. Frequently such cables, whether of the type employed for electrical transmission or cables such as hoisting cables, when reeled on large reels in long continuous lengths, weigh twenty tons or more.

When reeling such heavy cables it is obviously necessary to provide mechanism to lift the empty reel, hold it in position while the reeling operation is performed, and again lower it when the reel is completely filled.

It is also necessary to provide a drive for the reeling mechanism which limits the tension on the cable between the last driving capstan and the take-up reel. It is furthermore desirable that tension be adjustable during the reeling operation so that the effective tension will remain constant despite the variation in effective diameter as the reel is filled.

It is also desirable to have a means whereby the driving member or dog for the take-up reel may be manually positioned to align this dog with the corresponding aperture in the reel flange, since even the empty reel is heavy and bulky and it is extremely difficult to properly position this aperture with respect to the dog.

It has been found in practice also that due to the difference between friction on starting and friction during running, it has been necessary to increase the tension of the driving clutch at starting of partially filled reel which necessitates releasing the tension thereafter.

It is of course undesirable to have to make this double adjustment. The present reeling machine obviates this undesirable arrangement by providing a short boost or kick on the reel shaft under starting conditions and thereby eliminates the starting adjustment of the clutch drive. This boosting arrangement also provides a means for taking up any slack which may exist between the final capstan and the reeling device prior to putting the reeling device in operation and thus assures that the slack will not be taken up suddenly with the possibility of breakage which results therefrom.

It is an object of the invention to provide a reeling machine for heavy reels wherein means are provided for properly locating the driving dog with respect to the mating reel flange aperture.

It is another object of the invention to provide power driven means for inserting the reel spindles and driving dog into the reel and for lifting the reel from the floor by power means.

It is another object of the invention to provide a clutch mechanism which is adjustable while the reel is in operation so that the tension on the cable being wound upon the reel can be adjusted and maintained constant despite the varying winding diameter resulting from filling of the reel.

It is another object of the invention to provide means to overcome the static friction present at starting, thereby eliminating the necessity for adjusting the clutch tension at this time, and to utilize this auxiliary drive to take up any slack in the cable when initially starting thereby assuring that the slack is not removed so abruptly as to damage either the cable or the reeling mechanism.

Other objects and features of the invention will be apparent when the following description is considered in connection with the annexed drawings, in which:

FIGURE 3 is a side elevational view of the rope clutch drive of the machine taken from the right-hand side as indicated by the section line 3—3 of FIGURE 1;

FIGURE 4 is a cross-sectional view of the rope clutch drive, the view being taken on the plane of the line 4—4 of FIGURE 3; and FIGURE 5 is a schematic diagram of pneumatic control means for the reel arm locating and lifting mechanisms as well as for the boost motor.

Figure 1:
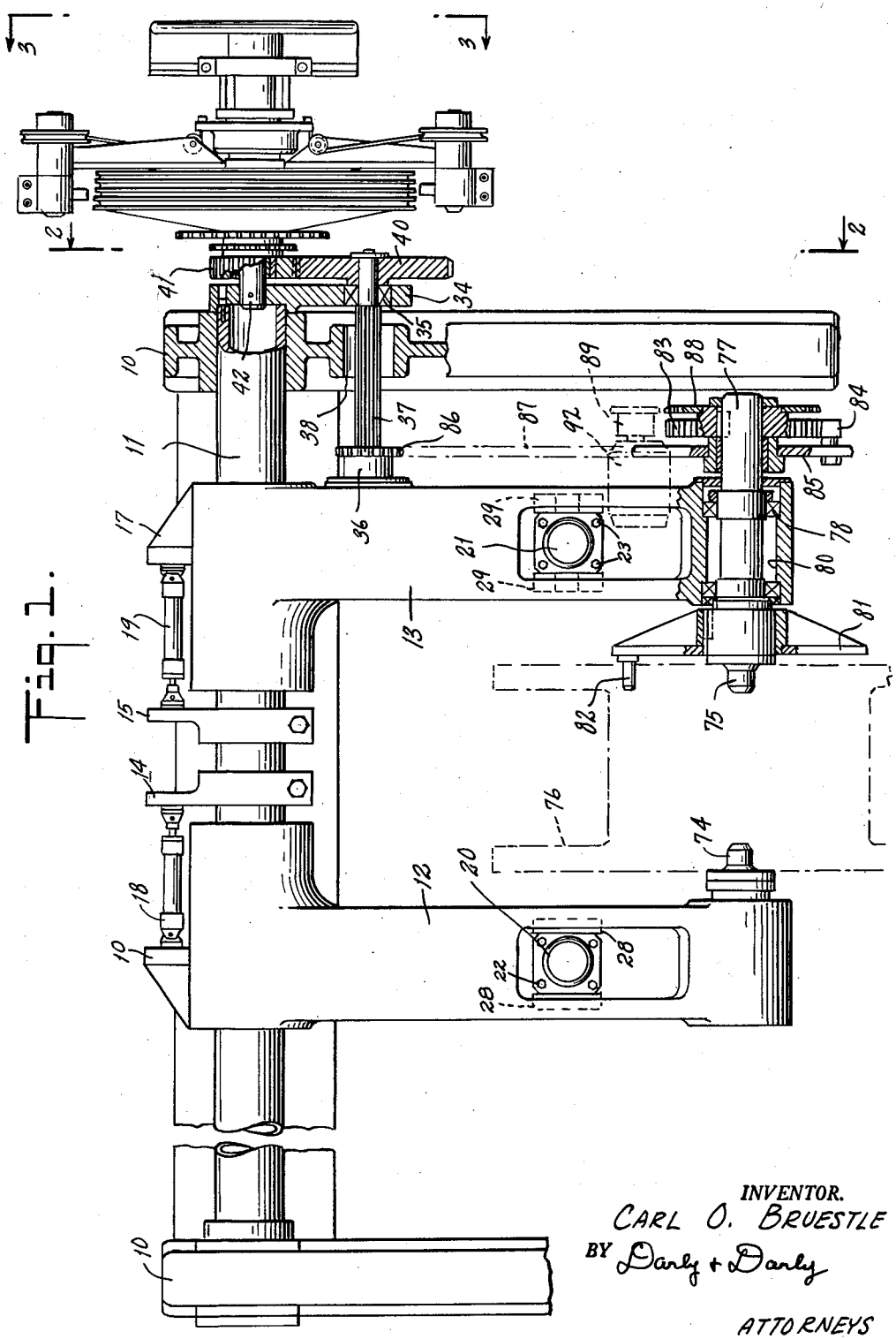
FIGURE 1 is a top plan view of the reeling machine of my invention, portions thereof being in section as indicated by the line 1—1 of FIGURE 2.
Figure 2:
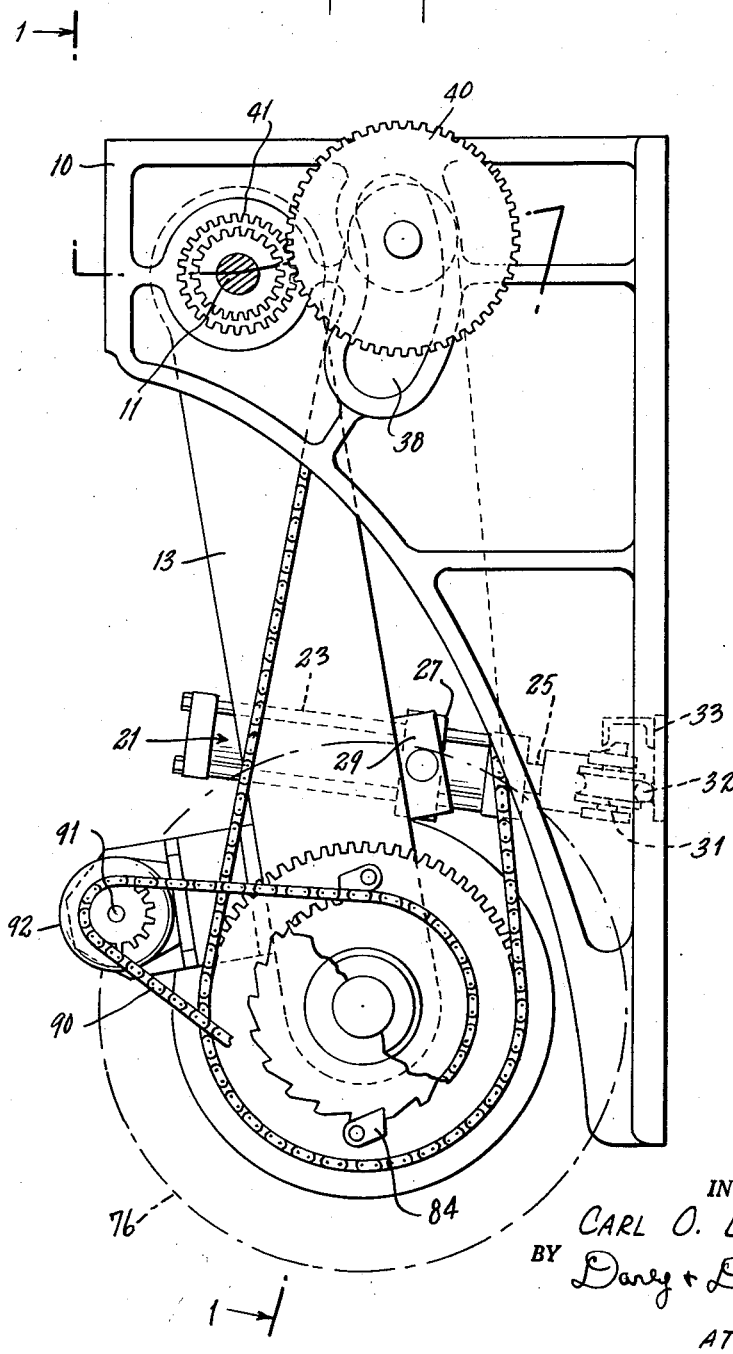
FIGURE 2 is a vertical cross-sectional view taken on the plane of the line 2—2 of FIGURE 1.

Referring now to the drawings and particularly to FIGURES 1 and 2, the machine elements are supported in two side frames 10. Between these frames is a hollow shaft 11 on which two reel supporting arms 12 and 13 are slidably mounted.

Adjustably fixed to the shaft 11 are anchor arms 14 and 15. Between each of the arms 14 and 15 and extensions 16 and 17 respectively of arms 12 and 13 are hydraulic cylinders 18 and 19 which cylinders may be separately controlled to move the corresponding reel arm in either direction to thereby increase or decrease the spacing between these arms.

Reel arms 12 and 13 as well as arms 14 and 15 are keyed to shaft 11 which shaft therefore rotates with the reel arms.

Referring now particularly to FIGURE 2, a hydraulic lifting means is fixed to each reel arm of which only the arm 13 shows in FIGURE 2. The lifting mechanism comprises a hydraulic cylinder for each reel arm, the left-hand cylinder being designated 20 and the right-hand one 21. These cylinders are provided with the usual tie rods 22 and 23 (FIG. 1) and with piston rods only one of which designated 25 is shown in FIG. 2. Blocks such as 27 are firmly secured on the tie rods 22 or 23 and to cylinders 20 and 21 respectively. Pivotally mounted on the blocks are operating members 28 and 29 (FIG. 1) which are fixed to the respective arms 12 and 13.

At its lower end each of the piston rods for cylinders 20 and 21 is provided with rollers such as 31 which rollers are grooved and ride a track 32 mounted on a base rail 33 extending longitudinally between the frames 10. It will be seen that when the cylinders 20 and 21 are operated they cause the respective arms to be elevated pivoting about the bearings in which shaft 11 is mounted. As will appear hereinafter the admission of hydraulic fluid to cylinders 20 and 21 is simultaneously effected so that the arms 12 move in synchronism as respects their pivoting movement.

Fixed to the right-hand end of shaft 11 is an arm 34. Mounted adjacent the outer end of this arm is a bearing 35 and rotatably mounted in bearing 35 and a bearing 36 on reel arm 13, is a shaft 37. It will thus be seen that as the reel arms are pivotally moved, shaft 37 likewise pivots about shaft 11 as a center. It will be noticed that the right-hand frame 13 is provided with a curved slot 38 through which the shaft 37 passes. It will further be clear that since shaft 37 is a splined shaft and cooperates with an internally splined hub on sprocket wheel 86, the lifting arm 13 can be moved axially while maintaining the gear 40 in mesh with a gear 41. At the same time the sprocket wheel 86 will be maintained in alignment with its cooperating sprocket wheel later to be described.

Mounted at the right-hand end of shaft 37 and fixed thereto is a gear 40 which gear meshes with a gear 41 rotatably mounted on a shaft 42 mounted in the arm 34 concentric with shaft 11. At its opposite or right-hand end shaft 42 is rotatably mounted in a sleeve 43 which is in turn supported in a bushing 44 mounted on a support 45, FIGURE 4.

Gear 41 is not directly mounted upon shaft 42, but is instead fixed to sleeve 46 which sleeve is rotatably mounted upon the shaft 42. Likewise fixed to the sleeve 46 is a spider 47, see FIGURE 3, which at its outer end carries supporting and tensioning members 48 and 50 for the rope drive elements 51 and 52. The rope drives 51 and 52 cooperate with a drum 53, which drum has a hub 54 rotatably mounted on the sleeve 46. Fixed to hub 54 is a sprocket wheel 55 which is in turn driven by a chain from a power source which may be the same source as that which supplies the cable making machine.

It will be seen from the above that drum 53 is constantly rotating at a given speed when the machine is operating. By increasing or decreasing the tension on ropes 51 and 52 spider 47 will tend to operate at increased or decreased speed always, however, at a linear rate greater than that of cable production. Since the actual linear speed is necessarily that of cable production the result is that by adjusting the speed the tension on the cable is varied.

The means for adjusting the rope tension while the reeling proceeds, is best seen in FIGURES 3 and 4. As indicated hereinabove, a rope mounting and tension adjusting mechanism is provided at each end of the spider 47, these being generally designated 48 and 50. The mechanism 48 will be described in detail, it being understood that mechanism 50 is identical.

The mechanism 48 consists of a shaft 56 rotatably mounted in a hub 57 fixed to the end of spider 47. Fixed to one end of shaft 56 is a pulley 58 while fixed to the opposite end is a rope supporting clamp 60. The clamp 60 has apertures extending therethrough at its upper end and a hook 61 formed at its lower end. The rope 51 is fixed in one of the two openings as by means of the rope clamp 62. The rope then extends to and about the drum 53 lying in grooved portions thereof, passes over the hook 61 and returns in a second groove of the drum, passes through the second opening in clamp 60 and is held in position therein by another rope clamp 62.

Mounted on ribs extending outwardly from the right-hand side of spider 47 are two guide pulleys 63 and 64. A cable is fixed to the pulley 58 of each of the adjusting mechanisms 48 and 50, these cables being designated 65 and 66. Cables 65 and 66 then extend around the respective pulleys 63 and 64 and are fixed to a sleeve 67 mounted for rotation on a bearing 68. Bearing 68 is mounted on a sleeve 70 which is in turn threadedly mounted on the sleeve 43.

At the outer end of sleeve 43 is a handwheel 71. It will be seen that as the handwheel is rotated the sleeve 70 acting as a nut is caused to move axially of the shaft 42 the nut or sleeve 70 being prevented from rotation by means of the pin 72 fixed in nut 70 and slidably mounted in an aperture in the bearing 44. Therefore as the nut moves axially carrying the sleeve 67 therewith, cables 65 and 66 cause rotation of the shafts 56 thereby rotating the clamps 60 and increasing or decreasing the tension on the ropes 51 and 52.

Referring now to FIGURE 1, it will be seen that each arm 12 and 13 is provided with a spindle 74 and 75 respectively. Spindles 74 and 75 enter the central opening of a reel indicated in dotted lines and designated 76 and form bearings for the reel.

The right-hand spindle 75 is formed on a shaft 77 which shaft is mounted in suitable bearings 78 in an aperture 80 in the arm 13. Keyed to shaft 77 at its left-hand end is a driving disk 81 which carries a driving dog 82 which cooperates with an opening in the reel flange. Keyed to the shaft 77 at its right-hand is a ratchet wheel 83. Cooperating with the teeth of ratchet wheel 83 are pawls 84, see FIGURE 2, which pawls are pivotally mounted on one side of a sprocket wheel 85 which sprocket wheel is rotatably mounted on the shaft 77.

Thus the position of disk 81 and dog 82 may be manually adjusted to position the dog in proper alignment with the driving aperture in a reel flange without operating the drive mechanism, the pawl and ratchet arrangement permitting this adjustment. Sprocket wheel 85 is driven from shaft 37 through the medium of the sprocket wheel 86 fixed to that shaft and the chain 87.

Fixed to ratchet wheel 83 is a sprocket wheel 88 which, through the medium of chain 90, see FIGURE 2, is driven by a sprocket wheel 91, fixed to the shaft of an overrunning clutch 89 driven by an hydraulically or pneumatically operated boost motor 92. The boost motor 92 is mounted on the right-hand reel arm 13. The motor 92 may be an hydraulic motor with a vane mounted for rotation within the cylinder and adjusted to make less than a complete rotation. This motor is arranged to be actuated whenever the reeling device is started, the motor 92 giving the initial "kick" to the reel shaft 77 to overcome static friction. Additionally, as will appear, means are provided to operate the motor 92 repeatedly if necessary in order to take up slack between the final drawing capstan of the cable machine and the reel.

Referring now to FIGURE 5, which shows a pneumatic means for operating the various mechanisms described above (the pneumatic means being shown since such means are comparable to hydraulic means and simpler to describe in that they do not require return piping to a common reservoir). The operation of these controls and of the various mechanisms hereinabove described will be considered in connection with the procedure followed in mounting a reel in the machine, fixing the cable thereto, taking slack out of the cable, adjusting the cable tension, operating to form the complete package on the reel and removing the filled reel from the machine.

The operator first positions a reel on the floor with its center openings in vertical alignment with the spindles 74 and 75 and with the aperture for receiving the driving dog in any rotational position. He then operates the control valve 93 in the proper direction to raise or lower the lifting arms 12 and 13 until the spindles 74 and 75 are in horizontal alignment with the reel center.

The operator now rotates the disk 81 (in a counter-clockwise direction as seen in FIGURE 2) to bring the dog 82 into angular alignment with the drive opening in the reel flange, this being possible because of the presence of the over-running clutch composed of the ratchet wheel 83 and pawls 84.

Next the operator moves one of the control valves 94 and 95 to admit pressure fluid to the left-hand side of the cylinder 18 or the right-hand side of the cylinder 19. This actuation moves one of the spindles 74 or 75 into position in the axial reel opening. Thereafter the unoperated control valve of the pair 94 and 95 is operated to move the remaining spindle into position in the reel opening. Of course, the movement of spindle 75 is accompanied by movement of the driving dog 82 which likewise enters the driving opening in the reel flange.

The operator now again operates valve 93 in the lifting direction and thus lifts the reel from its support on the floor or like surface into a desired position for reeling cable. The cable is now attached to the reel in known manner and the operator may, by operating a pushbutton 96, close a circuit through a solenoid operated valve 97 to thereby energize the motor 92 to move the reel through a small angle to take up slack in the cable. Pushbutton 96 may be operated as many times as is necessary to remove all slack from the cable.

Next the operator closes the circuit to solenoid valve 97 by closing the electrical contact 98. This contact 98 is tied in with the cable machine drive motor and remains normally closed. As a result of the starting of the main cable machine the sprocket 55 is driven and through the train of mechanism already described including the rope clutch and the over-running drive, the reel is rotated in the take-up direction. The tension on the rope drive is adjusted by means of the handwheel 71 as previously explained to maintain the cable taut and provide the proper snubbing action on the last capstan of the main cable machine while also providing proper tension of the cable as placed on the reel. As pointed out hereinabove, the rope drive tension may be adjusted while the machine is operating to thus take care of the variations in cable tension produced by such factors as the constantly increasing diameter of the effective cable reel as the cable is wound upon that reel.

It will be seen that when the contact 98 is closed it also causes operation of valve 97 thus energizing the boost motor 92 which through the overrunning clutch 89 gives the reel a kick which breaks the static friction and permits the main drive to take over through the pawl and ratchet overrunning clutch arrangement above described. When the main machine stops for any reason, contact 98 opens and pressure fluid will then be fed to the opposite side of the boost motor restoring that motor to its initial position ready for boost operation when the machine is again started by closure of contact 98 in the same manner as previously described.

When the package is completed the operator actuates valve 93 so as to connect cylinders 20 and 21 to atmosphere through restricted openings. This slows down the descent of the loaded reel and permits it to be deposited gently upon the floor or other supporting surface. Thereafter the operator actuates control valves 94 and 95 to cause admission of pressure fluid to the right-hand side of cylinder 18 and the left-hand side of cylinder 19, thus increasing the space between spindles 74 and 75 and simultaneously removing the drive dog from its corresponding reel flange opening. This completes the operation and the loaded reel is now taken from the machine.

Referring again to FIGURE 5, and from the above description it will be realized that the cylinders 18 and 19 are of the double acting type and that the control valves 94 and 95 are arranged to admit air or other pressure fluid to the left side upon operation of the control handle to the left and to the right side upon operation of the control handle to the right. The cylinders 20 and 21 are, however, of the single acting type and the control 93 has but three positions in one of which pressure fluid is admitted to the cylinders, in a second or middle position of which fluid is retained in the cylinder and in a third position pressure fluid is exhausted from the cylinder.

No further description of the schematic diagram of FIGURE 5 need be given save only to mention that a pressure fluid reservoir is shown at 100, this reservoir being connected through the various pipes 101 to the control valves 93, 94, 95, 97 and to the operating pressure fluid cylinders.

While I have described a preferred embodiment of the invention, it will be understood that I wish to be limited not by the foregoing description, but solely by the claims granted to me.

What is claimed is:

1. In a machine for winding cable and the like upon a flanged reel having central spindle receiving openings and an aperture in one flange for receiving a driving dog, in combination, a pair of reel supporting spindles adapted to engage the central reel openings, a driving dog adapted to enter the reel flange aperture, means to move said spindles toward and away from each other to enter into and be withdrawn from the central reel openings, said moving means also causing said driving dog to enter and withdraw from the reel flange aperture, means for moving said spindles in a substantially vertical direction to raise a reel supported on said spindles from and deposit it on a supporting surface, power means for rotating said driving dog about said spindle axis to thereby rotate said reel to wind cable thereupon, a fluid pressure motor and means coupling said fluid pressure motor to said driving dog during a short interval when rotation of said driving dog and reel is initiated to thereby overcome the initial frictional resistance while utilizing a power means of limited output.

2. A cable reeling machine as claimed in claim 1, wherein said fluid pressure motor has a stroke which is a small fraction of a complete revolution of said driving dog.

3. In a machine for winding cable and the like upon a flanged reel having central spindle receiving openings and an aperture in one flange for receiving a driving dog, in combination; a pair of spaced frame members; a shaft oscillatably mounted in said frame members; a pair of arms mounted on said shaft for oscillation therewith, said arms being slidable axially of said shaft; a pair of reel supporting spindles adapted to engage the central openings of a cable reel, one of said spindles being mounted on each of said arms; a driving dog adapted to enter a reel flange aperture, said dog being mounted concentrically with and positioned radially outwardly of one of said spindles; pressure fluid means for moving said arms along said shaft toward and away from each other to cause said spindles to enter into and be withdrawn from the central reel openings, said driving dog entering the reel flange aperture as said one spindle enters the corresponding central reel opening; pressure fluid operated motor means extending between said reel arms and a supporting surface, said pressure fluid motors serving to raise and lower said arms simultaneously to lift a cable reel supported on said spindles from or deposit it on a supporting surface and to retain said reel at a desired height above said supporting surface, power means for rotating said driving dog to thereby rotate a reel to wind cable thereupon while said reel is supported on said spindles; means intermediate said power means and said driving dog for adjusting the power delivered to said dog, said last mentioned means being mounted coaxially with said oscillatable shaft adjacent one end thereof; means comprising a pair of gears, one mounted coaxially of and in alignment with said oscillatable shaft and the other mounted on one of said arms for transmitting power from said power adjusting means to said driving dog at any position of said supporting arms relative to the machine base; an additional power source comprising a fluid pressure operated motor mounted on said one arm, said motor including an overrunning clutch, said overrunning clutch being directly connected to said driving dog and manually operated means for operating said additional power source to advance said dog to thereby align said dog with said reel flange aperture.

4. In a machine for winding cable and the like upon a flanged reel having central spindle receiving openings, and an aperture in one flange for receiving a driving dog, the machine being of the type wherein the cable is taken directly from a cable forming machine and the power source for the reeling machine is the same as that for the cable forming machine, in combination; a pair of reel supporting spindles adapted to engage the central reel openings; a driving dog adapted to enter the reel flange aperture, an adjustable clutch member driven from the power source for the cable forming machine and driving said driving dog; an auxiliary power source comprising a short stroke motor and an over-running clutch directly connected to said driving dog; manually operable means for energizing said auxiliary power source to rotationally advance said driving dog and the reel driven thereby in small increments to tension the cable length between the forming machine and a reel to a desired extent; and means operable upon initial energization of the power source of the cable forming machine to energize said auxiliary power source to thereby advance said driving dog through a single small increment to overcome static friction of the parts and inertia of said reel upon initiation of operation of the cable forming machine and said driving dog to thereby overcome the internal frictional resistance while utilizing a power means of limited output.

5. In a machine for winding cable and the like upon a flanged reel having central spindle receiving openings, and an aperture in one flange for receiving a driving dog, the machine being of the type wherein the cable is taken directly from a cable forming machine and the power source for the reeling machine is the same as that for the cable forming machine, in combination; a pair of spaced frame members; a shaft oscillatably mounted in said frame members; a pair of arms mounted on said shaft for oscillation therewith; said arms being slidable axially on said shaft; a pair of reel supporting spindles adapted to engage the central openings of the cable reel, one of said spindles being mounted on each of said arms; a driving dog adapted to enter a reel flange aperture, said driving dog being mounted concentrically with and positioned radially outwardly of one of said spindles; pressure fluid means for moving said arms along said shaft toward and away from each other to cause said spindles to enter into and be withdrawn from the central reel openings, said driving dog entering the reel flange aperture as said one spindle enters the corresponding central reel opening; manually operable means for operating said pressure fluid means; pressure fluid operated means extending between the outer ends of said reel arms and a supporting surface; a track extending longitudinally between said frame members; rollers mounted on said pressure fluid means riding on said track; manually operated means for energizing said pressure fluid means to lift said arms; and a cable reel supported thereon to a desired position, said control means retaining said arms in said desired position; adjustable power transmission means between said cable forming machine power source and said driving dog; a short stroke auxiliary power source mounted on said one reel arm, said auxiliary power source including an overrunning clutch; means driving said driving dog from said auxiliary power source; manually operable means for energizing said auxiliary power source to produce small increments of rotary motion of said driving dog to tension a cable length between the cable forming machine and a reel supported on said spindles; and means operated upon energization of the cable forming machine power source to energize said auxiliary power source to produce a small increment of rotational movement of said driving dog to overcome static friction of the cable reeling machine as well as inertia of the reel supported on said spindles, said auxiliary source being restored to normal unenergized position on deenergization of the cable forming machine power source.

6. In a machine for winding cable and the like upon a flanged reel having central spindle receiving openings, and an aperture in one flange for receiving a driving dog, the machine being of the type wherein cable is taken directly from a cable forming machine and the power source for the reeling machine is the same as that for the cable forming machine, in combination; means for supporting the cable reel upon spindles in a position free of other support, a driving dog adapted to enter a reel flange aperture, said driving dog being mounted concentrically with and positioned radially outwardly of one of said spindles; means for driving said dog from the cable machine power source, a short stroke auxiliary power source including an overrunning clutch, means driving said driving dog from said auxiliary power source, and means operated upon energization of the cable forming machine power source to energize said auxiliary power source to produce a small increment of rotational movement of said driving dog to overcome static friction of the cable reeling machine as well as inertia of the reel supported on said spindles, said auxiliary source being restored to normal unenergized position upon deenergization of the cable forming machine power source.

7. In a machine for winding cable and the like upon a flanged reel having central spindle receiving openings, and an aperture in one flange for receiving a driving dog, the machine being of the type wherein cable is taken directly from a cable forming machine and the power source for the reeling machine is the same as that for the cable forming machine, in combination; means for supporting the cable reel upon spindles in a position free of other support, a driving dog adapted to enter a reel flange aperture, said driving dog being mounted concentrically with and positioned radially outwardly of one of said spindles; means for driving said dog from the cable machine power source, a short stroke auxiliary power source including an overrunning clutch, means driving said driving dog from said auxiliary power source, manually operable means for energizing said auxiliary power source to produce small increments of rotary movement of said driving dog to tension a cable length between the cable forming machine and a reel supported on said spindles; and means operated upon energization of the cable forming machine power source to energize said auxiliary power source to produce a small increment of rotational movement of said driving dog to overcome static friction of the cable reeling machine as well as inertia of the reel supported on said spindles, said auxiliary source being restored to normal unenergized position upon deenergization of the cable forming machine power source.

References Cited in the file of this patent
UNITED STATES PATENTS

| | | |
|---|---|---|
| 881,028 | Robinson | Mar. 3, 1908 |
| 1,473,564 | Klepper et al. | Nov. 6, 1923 |
| 2,300,343 | Clay | Oct. 27, 1942 |
| 2,335,079 | Patterson | Nov. 23, 1943 |
| 2,524,106 | Hanson | Oct. 3, 1950 |
| 2,621,736 | Scruggs et al. | Dec. 16, 1952 |
| 2,624,522 | Van Hook | Jan. 6, 1953 |
| 2,734,606 | Bellamy | Feb. 14, 1956 |